United States Patent Office 3,697,315
Patented Oct. 10, 1972

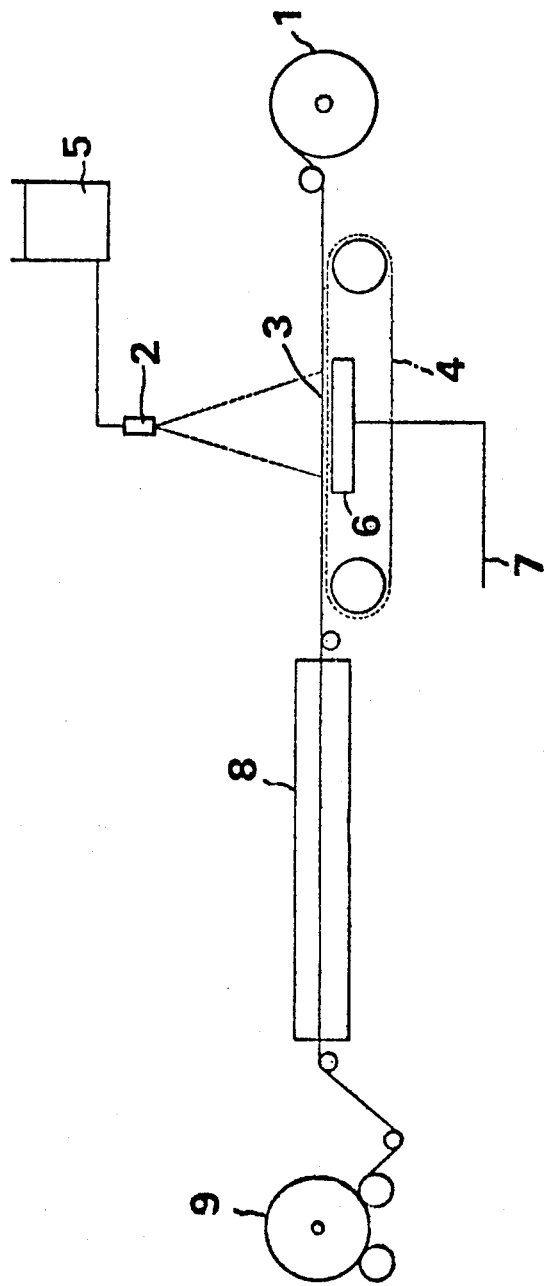

3,697,315
SELF-ADHESIVE AND REMOVABLE NON-WOVEN
FABRIC AND PROCESS FOR PRODUCING THE
SAME
Keiji Mine, Matsubarashi, Japan, assignor to Mitsubishi
Chemical Industries, Ltd., Tokyo, Japan
Filed May 7, 1970, Ser. No. 35,448
Claims priority, application Japan, July 21, 1969,
44/58,111
Int. Cl. A61l 15/00; C09j 7/04
U.S. Cl. 117—122 P          9 Claims

ABSTRACT OF THE DISCLOSURE

A self-adhesive non-woven fabric comprising a rough surfaced fiber sheet of staple fibers, wherein the staple fibers on both sides of the sheet are coated with an adhesive mixture of a natural rubber latex, a synthetic resin latex, and an antioxidant, wherein said latex mixture is characterized by being generally non-adhesive toward said fibers.

BACKGROUND OF THE INVENTION

Field of invention

This invention relates to self-sticking removable non-woven fabric which is characteried by good adhesive properties and good air permeability, elasticity, water resistance and strength. This invention further relates to a process for producing said self-sticking non-woven fabrics.

Description of prior art

It has been known that various types of non-woven fabrics can be produced by impregnating resins into fiber sheets. For example, it is known to form synthetic leather by impregnating a polyurethane resin onto a non-woven fiber sheet. Also, it is known to impregnate a non-woven fabric with polyethylene resin to form a core of clothes. Other types of non-woven fabrics coated with polyamide resins have been used as bags, etc.

Accordingly, it is an object of this invention to provide a novel self-sticking and easily removable non-woven fabric having good adhesive properties, good air permeability, elasticity, water resistance and strength.

Another object of this invention is to provide a novel self-sticking and easily removable non-woven fabric which may be used as a tearable bandage or dressing material.

A still further object of this invention is to provide a novel self-sticking and removable non-woven fabric which further is impregnated with a suitable germicide or disinfectant.

A further object of this invention is to provide processes for producing self-sticking, non-woven fabrics of the present invention.

SUMMARY OF THE INVENTION

These and other objects have now herein been attained by providing a self-sticking and easily removable non-woven fabric having good adhesive properties and good air permeability, elasticity, water resistance and strength wherein a rough surfaced fiber sheet is coated with a mixture of a natural rubber latex and a synthetic resin latex, having an antioxidant.

DETAILED DESCRIPTION OF PREFERRED EMBODIMENTS

The fiber sheet used for this invention should have an appropriate bulk density of from about 0.03 g./cm.$^3$ to 0.3 g./cm.$^3$ and preferably from about 0.04 g./cm.$^3$ to 0.07 g./cm.$^3$. The bulk density is measured by the standard test JIS P8118 calculated by the following formula:

$$\text{Bulk density (g./cm.}^3\text{)} = \frac{W}{T \times 1000}$$

wherein:

T = thickness (mm.)
W = broadness (g./m.$^2$).

If the bulk density is too high, the mixture of the natural rubber latex and the synthetic resin latex will cover the entire surface of the fiber sheet so that the film will not be self-adhesive. Moreover, when the bulk density is too high, the permeability of the finished produced will be insufficient for many applications. On the other hand, if the bulk density is too low, the number of fiber edges will be insufficient to entwine with the fiber edges on the opposite surface of the fiber sheet. Also, the strength of the fiber sheet will be so weak that it will be difficult to obtain a finished product having suitable strength charteristics.

The length of the staple fibers used for this invention should be long enough to provide good elasticity to the finished product. Preferably, the length of the fibers in the sheet is at least 1.5 mm. and more preferably 2 to 30 mm. Most preferably, the fiber length is between 3 to 20 mm. Although shorter staple fibers can be combined with the longer staple fibers, if the quantity of such shorter fibers of less than 1 mm. in length is too great, it will be difficult to obtain a finished product having sufficient elasticity. The fiber sheet used in this invention can be a non-woven fabric made of a pulp fiber or a cellulosic fiber such as cotton, rayon, or cellulose acetate or a synthetic fiber such as polypropylene, polyethylene, polyacrylonitrile, polyvinyl chloride, polyamide, or polyester fibers or combinations thereof. It is preferred to use the pulp fiber or combination of a pulp fiber and a staple fiber of a synthetic material or a cellulosic fiber. A crimped staple fiber is especially useful.

The fiber sheet can be prepared by either conventional dry processes or wet processes, although the dry processes are preferred. Those wet processes which yield a roughened sheet surface, however, are also equally preferred. If the surface of the fiber sheet is so smooth that the sheet is substantially covered by the latex mixture film, it is difficult to obtain sufficient adhesiveness and air permeability. The surface of the fiber sheet should have a multiplicity of fiber edges and should be quite rough. In fact, it is preferable to needle punch the fiber sheet to entangle the staple fibers. Needle punching is also desirable when several different fibers are used for effectively entangling the fibers. In this invention, a mixture of a natural rubber latex and a synthetic rubber latex is used for coating the staple fibers.

The synthetic resin latex is effective for preventing excessive adhesiveness as well as to improve the stability and to prevent fading of the finished product. The natural rubber latex used for this invention can be any type of natural latex, such as a commercial latex known as JIS K6381 which has the following properties:

| | |
|---|---|
| Total solid | 61.5% up. |
| Dried rubber content | 60% up. |
| Difference between total solid and dried rubber content | Less than 2%. |
| Total alkali | 1.6–2.3%. |
| Viscosity | Less than 150 cp. |
| Sludge | Less than 0.1%. |
| Coagulate content | Do. |
| Alkalinity | Less than 0.8%. |
| Mechanical stability | 400 seconds up. |
| Copper content | Less than 0.001%. |
| Manganese content | Do. |

The synthetic rubber latex used in this invention should have good extensibility and elasticity. Suitable latex materials include styrene-butadiene rubber latex (SBR), acrylonitrile-butadiene rubber latex (NBR), polychloroprene rubber latex (CR). NBR is especially preferred because of its excellent extensibility and elasticity. A wide variety of other latices having good extensibility and elasticity can also be used in this invention.

The quantity and the particular type of natural rubber latex and synthetic resin latex used should be determined so as to provide a mixture which will have acceptable adhesive qualities in its dried state, but which will be generally non-sticky to the fiber itself. In order to obtain and to maintain these properties, it is desirable to add an antioxidant to the latex mixture. Where the natural rubber latex used is too sticky, or fluid in its dried state, a high percentage of the synthetic resin latex should be used in the admixture, or a hard type of synthetic resin latex should be used in the admixture. Alternatively, where the natural rubber latex is characterized by a high fluidity in its dried state, it can be hardened by partial curing or vulcanization. In any case, it is necessary to prevent further change in the physical properties of the dried natural latex by adding an antioxidant.

The adhesiveness of the dried latex mixture of this invention can be examined by measuring the adhesiveness of a filament yarn coated with the dried latex. If two pieces of a coated filament yarn can be adhered together by pressing, the latex mixture is suitable for this invention unless the degree of adhesiveness becomes reduced by aging.

The adhesive quality and strength characteristics of the finished product can be modified by varying the ratio of the natural rubber latex to the synthetic resin latex and is selected in accordance with the particular anticipated utility for the finished product and the total amount of the mixture coated. Where relatively low adhesive quality is required, such as where a large quantity of latex is used in coating the fibers, the ratio of the natural rubber latex to the synthetic resin latex should be low. On the other hand, when a small amount of the mixture is coated or where high adhesive quality is otherwise required, the ratio of natural rubber latex should be high.

In general, the ratio of synthetic resin latex to natural rubber latex may be between 1-5:5-9 by weight and preferably between 2-4:6-8 by weight, depending upon the required adhesive quality and desired air permeability, elasticity and strength of the finished product.

If an excess amount of synthetic latex is used, the adhesive quality of the entwined staple fibers coated with the mixture can be so substantially reduced that the desired self-sticking property will not be obtained. If an excess amount of the natural rubber latex is used, the adhesive quality or bindability of the entwined staple fibers coated with the mixture can be so substantially increased that the desired properties of the finished product will not be obtained.

In order to control the extent of aging of the natural rubber latex or the synthetic resin latex, it is desirable to admix an antioxidant with the latex. Suitable antioxidants include: 4,4-dihydroxydiphenylcyclohexane, derivative of 6-t-butyl-3-methylphenol, 4,4'-thiobis-(6-t-butyl-3-methylphenol), 2,6-di-t-butyl-p-cresol, styrenated phenol, 3-methyl-4-isopropylphenol, 5-methyl-2-isopropylphenol, 2,6-di-t-butyl-4-methylphenol, 2-t-butyl-4-methylphenol, 4-methoxyphenol, p-phenylphenol, 2,6-di-t-butylphenol, 4 - hydroxymethyl-2,6-di-t-butylphenol, 2,2'-methylene-bis-(6-t-butyl-4-cresol), 4,4'-butylidene-bis-(6-t-butyl-3-methylphenol), 2,5-di-t-butylhydroquinone.

Where the finished product is intended to be used as a medical implement, such as a bandage or dressing material, it is preferable to use an antioxidant having good germicidal properties, such as 3-methyl-4-isopropylphenol, or 5-methyl-2-isopropylphenol. Other types of germicides, however, can also be used in the latex mixture.

The quantity of antioxidant used is dependent upon the particular anticipated use. In general, about 0.1 to 1.0% by weight of solvent content of the mixture is sufficient. Where necessary, such as where the antioxidant is water-insoluble or not readily dispersible, the antioxidant may be dissolved in alcohol before addition to the mixture.

The latex mixture should be coated onto the sheet such that at least the minimum quantity is on each staple fiber. The mixture should not be coated onto the sheet, however, in such substantial quantities that a smooth film is formed covering the rough surface of the fiber sheet. However, the latex mixture should continuously bind the staple fibers of the fiber sheet at each intersection of the staple fibers so that the finished product of this invention will have a high degree of elasticity.

BRIEF DESCRIPTION OF THE DRAWING

Reference will now be made to the accompanying drawing for a further explanation of the process of producing the self-sticking and easily removable non-woven fabric of this invention.

The drawing is a diagrammatic view of the process of one embodiment of this invention. The fiber sheet 1 is coated with a mixture of a natural rubber latex and a synthetic rubber latex 5 by uniformly spraying the mixture 5 onto the surface of the fiber sheet 3 through the nozzle of spray 2 at a constant velocity during continuous travel of the fiber sheet past the spray nozzle. If desired, suitable pigments or coloring material can be added to the mixture 5, depending upon the application of the finished product. The amount of the mixture sprayed should be at least 10 parts by weight of solid content of latex mixture per 100 parts by weight of fiber sheet and in general, between about 15 to 200 parts by weight of solids. If less latex is sprayed, the adhesive quality, elasticity and strength of the finished product may be impaired so that the desired effects of this invention will not be attained. On the other hand, if an excess amount of the latex mixture is sprayed, the finished product will be inferior in air permeability and its high density will necessitate a significantly longer period of time for drying. In order to continuously coat the mixture onto the fiber sheet, an endless wire net 4 is used to support the sheet which is continuously moving at the time of spraying.

In this process, if a receptacle 6 is provided beneath the endless wire net 4, a sucking or slight vacuum action 7 will be created which will prevent scattering of the latex mixture. The latex mixture will therefore be more uniformly spread into the fiber sheet so that the formation of a latex film will be prevented.

Where the latex mixture is adhered to the wire net 4, the latex can be easily removed by using a wire brush. In order to transfer the liquid mixture 5 to nozzle 2, it is preferable to select a technique which will avoid imparting a shearing stress to the mixture. For example, one good transfer technique is a pressure transferring process using air pressure. It is not preferable to use a pump for this transfer. The fiber sheet sprayed with the mixed liquid is dried in dryer 8 at a temperature of between about 50° to 120° C. and preferably between 60° to 100° C. for a period of between 30 seconds and 1 minute. At temperatures above 100° C., vulcanization of the rubber latex may occur which will decrease the adhesive quality of the finished product.

Any conventional dryer 8 which removes moisture from the latex mixture can be used, but it is preferred to use a dryer equipped with a heater. It is possible to dry the product by ventilation according to any of a wide variety of industrial processes. However, it is most preferred to use a dryer which is equipped for both ventilation and heat.

The removal of moisture can be effectively accomplished by the use of an inclined plane for the sprayed product. The dried non-woven fabric is continuously wound on rollers 9. After treating both surfaces of the non-woven fabric with spraying and drying, the finished product of this invention is obtained.

The non-woven fabric of this invention which has been treated by spraying both sides of the fabric with the latex mixture and drying has good adhesive properties and excellent air permeability, elasticity, water resistance and strength as follows:

|  | Non-woven fabric of this invention | Conventional fiber sheet |
| --- | --- | --- |
| Adhesive strength (JIS Z1523) for splitting (g./10 mm.) | 7–50 | 0 |
| Elongation (JIS P8132) (percent) | 30–50 | 20–40 |
| Tensile strength (JIS P8113) (g./15 mm.) | 300–800 | 100–250 |

These physical characteristics were obtained by use of the standard method tests of the JIS as follows.

ADHESIVE STRENGTH FOR SPLITTING (JIS Z1523)

Two test pieces of 10 mm. width, 250 mm. length, and 0.815 mm. thickness were placed one over the other on a stainless steel plate and pressed by rolling with a 2,000±50 g. roller at a speed of 5 mm./sec., in one return, to adhere both of the test pieces.

After leaving the test pieces for more than 20 minutes, they are split by using a tension tester at the speed of 300±20 mm./min., and the load required for splitting the test pieces is measured.

ELONGATION (JIS P8132)

Elongation is measured by the method of JIS P8113 and calculated by the following formula:

$$\text{Elongation (percent)} = \frac{B}{A} \times 100$$

wherein B equals the length of elongation from first load point to break point. A equals the length between the holders before loading.

TENSILE STRENGTH (JIS P8113)

The upper edge of the test piece having a length of 200 mm., 15 mm. width, and 0.815 mm. thickness, is fixed on the upper clip. The lower edge of the test piece is fixed on the lower clip and the tension load at the breaking point is measured. The length between both clips is 100 mm. The self-sticking and easily removable non-woven fabric of this invention has several unique properties which are different from conventional adhesive tapes.

The coated fibers of the non-woven fabric of this invention possess good mutual adhesiveness so that two surfaces of the non-woven fabrics are self-sticking by placing one over the other and pressing. There is little or no adhesiveness, however, on other surfaces. Moreover, it is possible to repeatedly bind and remove the two surfaces of non-woven fabric repeatedly without damage to the surfaces.

By incorporating 3-methyl-4-isopropylphenol or 5-methyl-2-isopropylphenol, the resulting fabric will have excellent germicidal properties as well as excellent light fastness and durability. The non-woven fabric of this invention can be used for various applications such as medical supplies, sanitary bandages, clothing materials, dressing materials and ornaments. It is characterized by excellent dyeability, printability and processability which render it usable in a wide variety of applications.

Obviously, numerous modifications and variations of this invention are possible in light of the above teachings, for instance, the process for spraying the latex mixture can be replaced for the binder treatment in the manufacture of conventional non-woven fabrics.

Having generally described the invention, a further understanding can be obtained by reference to certain specific examples which are provided for purposes of illustration only and are not meant to be limiting in any manner.

EXAMPLE 1

Using the apparatus shown in the figure, a roll of fiber sheet 1, 120 cm. width, 500 m. length, having staple fiber length of 3–5 mm., 0.815 mm. of thickness, 40 g./m.$^2$ of broadness and 0.05 g./cm.$^3$ of bulk density, which had been produced by a dry process, was passed on a 60 x 80 mesh wire net 4 which travelled at a speed of 10 m./min.

A mixed liquid 5 having the following formula was transferred by air pressure and was continuously and uniformly sprayed onto the fiber sheet surface 3 through nozzle 2 at the rate of 15–200 g. of solid components of the latex per 100 g. of fiber sheet. The fiber sheet was sprayed with the mixed liquid and was dried in dryer 8 at a temperature of 60° to 100° C. for 30 seconds to 1 minute, and was continuously wound on roller 9. The same treatment was repeated on the back surface of the sheet.

| Example | I–1 | I–2 | I–3 | I–4 | I–5 |
| --- | --- | --- | --- | --- | --- |
| Natural rubber latex (solid component 62%) | 7.0 | 7.5 | 6.5 | 6.0 | 8.0 |
| NBR Latex (solid component 40%) | 3.0 | 2.5 | 3.5 | 4.0 | 2.0 |
| 3-methyl-4-isopropylphenol | 0.01 | 0.01 | 0.01 | 0.01 | 0.01 |
| Solid content | 5.6 | 5.7 | 5.4 | 5.3 | 5.8 |

The adhesive strength for splitting the finished product of non-woven fabric was measured by JIS Z1523 method. The adhesive strength for splitting was 25 to 40 g./10 mm. whenever two test pieces of nonwoven fabric as produced in Examples I–1, 2, 3, 4, and 5 were tested. However, it was zero whenever one test piece of non-woven fabric was contacted with an untreated paper or cloth. No damage to the surface of the non-woven fabric tested was detected, and the same data was obtained after repeated measurements. The tensile strength (JIS P8113) of each non-woven fabric of Examples I–1, 2, 3, 4, and 5 was in the range of 500 to 800 g./15 mm. The elongation (JIS P8132) of each non-woven fabric of Examples I–1, 2, 3, 4, and 5 was in the range of 40–50%.

EXAMPLE 2

The non-woven fabrics of Examples I–1, 2, 3, 4, and 5 were cut with a conventional cutter into a bandage form. The bandages obtained were of good adhesive quality, air-permeability, excellent elasticity, strength, waterproof, soft and germicidal.

Without using any clip, it was found that the edge of the wound bandage did not unfasten or loosen during the application of the bandage because it was self-sticking and had a good adhesive quality. The bandage had good air permeability so that the wrapped part was not wetted or contaminated, and accordingly, it is especially suitable for use in covering wet skin. The bandage did not loosen or slip from a joint region of arm or leg and also it did not tend to be tightly pressed to the point of application since it has good elasticity, flexibility, and softness. Since the staple fibers of the bandage are continuously bound to each other with the rubber latex mixture, the bandage is characterized by good strength and non-fraying so that it can safely be used without causing the spread of skin disease by encroaching fibers into the disease or wound. The bandage is waterproof and water-durable and accordingly, it is unnecessary to use an oil paper to prevent drying or permeation of ointment coated on the skin. The bandage aids in promoting the healing of skin eruptions and protects the skin from bacteria because of the uniquely advantageous quality of the germicide in combination wtih the non-woven fabric.

EXAMPLE 3

The non-woven fabrics of Examples I-1, 2, 3, 4, and 5 were cut by a conventional cutter to make grip tapes for golf clubs. The grip tapes of the non-woven fabric were characterized by a good adhesive quality, good air-permeability, and excellent elasticity, strength, waterproofness, flexibility, softness, and germicidal properties.

The grip tape was fixed to the golf club by simply winding the tape around the club. The grip tape did not loosen or slip from the golf club and it was not damaged by friction because of its excellent elasticity and strength. The grip tape will not become sticky by adsorption of perspiration during use due to the good air-permeability and waterproofness of the tape.

The grip tape can be used as a bandage when a skin injury is caused by playing gold because the tape is self-sticking and removable and contains the fungicide. The grip tape also prevents blisters on the palm of the hand, since the tape has appropriate cushion effects at the grip, as well as excellent softness.

Having now fully described the invention, it will be apparent to one of ordinary skill in the art that many changes and modifications can be made thereto without departing from the spirit or scope thereof.

Accordingly, what is claimed and intended to be covered by Letters Patent is:

1. A non-woven fabric having at least one coated surface which is capable of self-sticking such that one portion of the coated surface will adhere to another portion of the coated surface when pressed together, but wherein said coated surface has little or no adhesiveness toward uncoated surfaces, which comprises:
   a rough surfaced non-woven fiber sheet having a plurality of staple fibers, and having a bulk density of from 0.03 g./cm.$^3$ to 0.3 g./cm.$^3$, at least one surface of which is coated with a dried mixture of a natural rubber latex and a synthetic resin latex selected from the group consisting of styrene-butadiene latex, acrylonitrile-butadiene latex and polychloroprene latex, wherein the ratio of said natural rubber latex to said synthetic resin latex is from 5–9:1–5, by weight, such that the dried mixture will be self-adhesive, but will be substantially non-adhesive toward the uncoated fibers of said sheet.

2. The self-sticking non-woven fabric of claim 1 which contains an antioxidant in a quantity sufficient to prevent further change in the physical properties of the dried natural rubber latex.

3. The self-sticking, non-woven fabric of claim 1 wherein the staple fibers have a length of at least 1.5 mm.

4. The self-sticking non-woven fabric of claim 1 wherein from 10 to 200 parts by weight of solids per 100 parts by weight of fiber sheet is coated onto each surface of the fiber sheet.

5. A process for producing a self-adhesive non-woven fabric which comprises uniformly coating a mixture of a natural rubber latex and a synthetic resin latex, selected from the group consisting of styrene-butadiene latex, acrylonitrile-butadiene latex and polychloroprene latex, wherein the ratio of said natural rubber latex to said synthetic resin latex is from 5–9:1–5 by weight onto a fiber sheet having a bulk density of from 0.04 g./cm.$^3$ to 0.3 g./cm.$^3$ so as to coat the staple fibers contained on the surface of said fiber sheets but in amounts which will not form a continuous coating on said surfaces, and thereafter drying said latex mixture so as to form said self-adhesive non-woven fabric.

6. The process of claim 5, wherein said latex mixture is sprayed onto the staple fibers on both surfaces of said fiber sheet.

7. The process of claim 6, wherein said latex mixture is sprayed in an amount of between 10 parts by weight to 200 parts by weight of solid latex content per 100 parts by weight of such surface of the sheet.

8. The process of claim 5, wherein said fiber sheet is needled so as to entangle the staple fibers prior to coating with said latex mixture.

9. The process of claim 5, wherein said latex mixture contains an antioxidant in an amount sufficient to prevent further change in the physical properties of the dried natural rubber latex.

References Cited

UNITED STATES PATENTS

| | | | |
|---|---|---|---|
| 2,358,760 | 9/1944 | Reed | 161—167 |
| 3,554,940 | 1/1971 | Arakawa et al. | 117—122 PA |
| 3,039,893 | 6/1962 | Banigan, Jr., et al. | 117—122 P |
| 3,482,570 | 12/1969 | Schuster | 128—156 |

ROBERT F. BURNETT, Primary Examiner

L. KOECKERT, Assistant Examiner

U.S. Cl. X.R.

117—122 PA; 128—156; 161—167, 170